Fig. 1

Feb. 11, 1936.  R. K. JACK  2,030,299
HYDRAULIC TRANSMISSION
Filed March 6, 1934  8 Sheets-Sheet 2

Feb. 11, 1936.   R. K. JACK   2,030,299
HYDRAULIC TRANSMISSION
Filed March 6, 1934   8 Sheets-Sheet 4

INVENTOR
Robert K. Jack
BY Samuel H. Davis
ATTORNEY

Feb. 11, 1936. R. K. JACK 2,030,299
HYDRAULIC TRANSMISSION
Filed March 6, 1934   8 Sheets-Sheet 5

INVENTOR
Robert K. Jack
BY Samuel H. Davis
ATTORNEY

Feb. 11, 1936.   R. K. JACK   2,030,299
HYDRAULIC TRANSMISSION
Filed March 6, 1934   8 Sheets-Sheet 7

INVENTOR
Robert K. Jack
BY
Samuel H. Davis.
ATTORNEY

Feb. 11, 1936.   R. K. JACK   2,030,299
HYDRAULIC TRANSMISSION
Filed March 6, 1934   8 Sheets-Sheet 8

INVENTOR
Robert K. Jack
BY Samuel H. Davis
ATTORNEY

Patented Feb. 11, 1936

2,030,299

UNITED STATES PATENT OFFICE 2,030,299

HYDRAULIC TRANSMISSION

Robert K. Jack, Lansing, Mich.

Application March 6, 1934, Serial No. 714,333

5 Claims. (Cl. 60—53)

This invention relates to hydraulic or pneumatic power transmission apparatus, by which the power developed by any source of power may be used to drive a force pump, which supplies liquid or air under pressure through a pipe to a regulator or rotor devices.

The object of this invention consists in the special construction and combination of parts which by admitting the power fluid at different distances from the center of rotation, the leverage can be changed at will, which makes it practicable to obtain a variable power effect applied to the rotor, and, in the case of an automobile vehicle at the road wheels. It is also an object of this invention to afford means of driving the machine or vehicle at varying speeds and with varying power, and to enable the invention to be employed as a braking means.

The construction and arrangement of the parts of this invention are illustrated in the accompanying drawings of which

Throughout the drawings and description the same number is used to refer to the same part.

Figure 1:
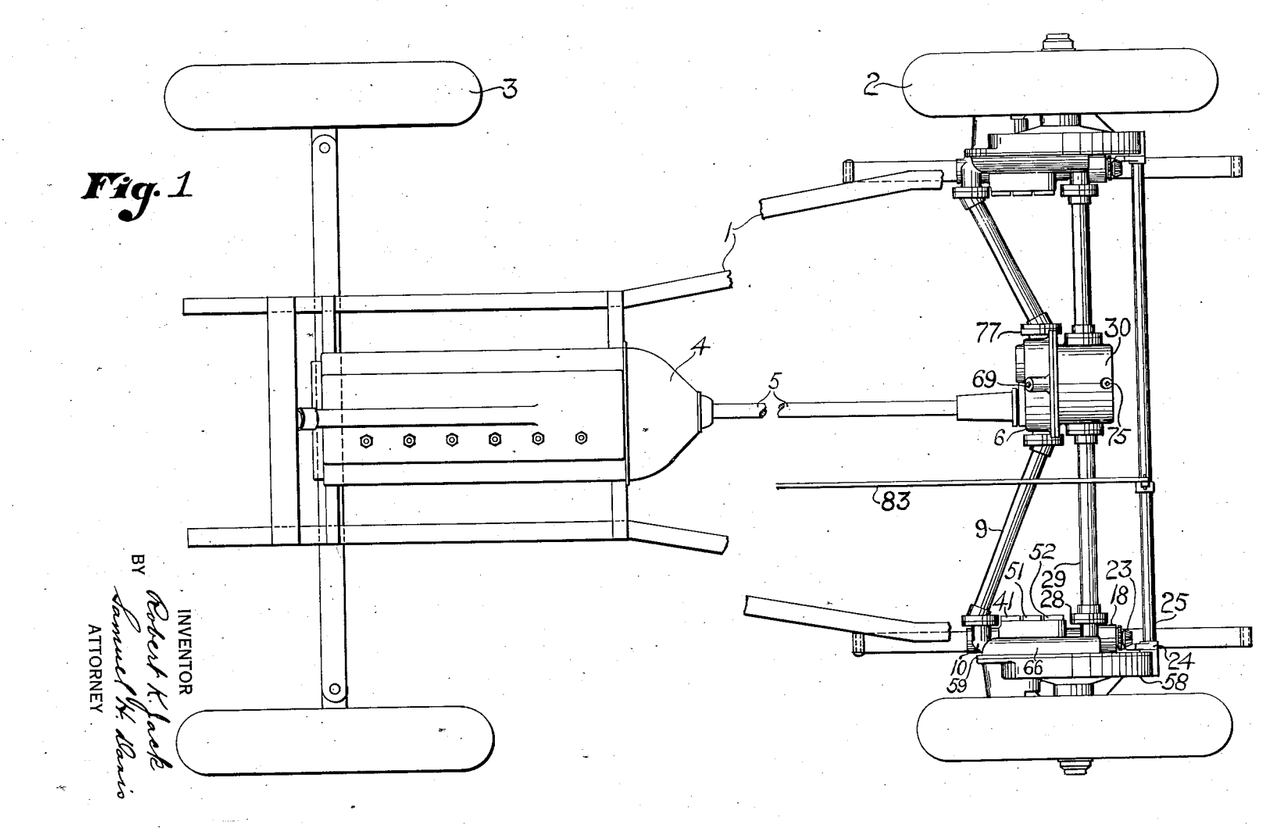
Fig. 1 represents a top view of an automobile frame showing the wheels and motor or engine thereon, with this invention applied thereto.
Figure 4:
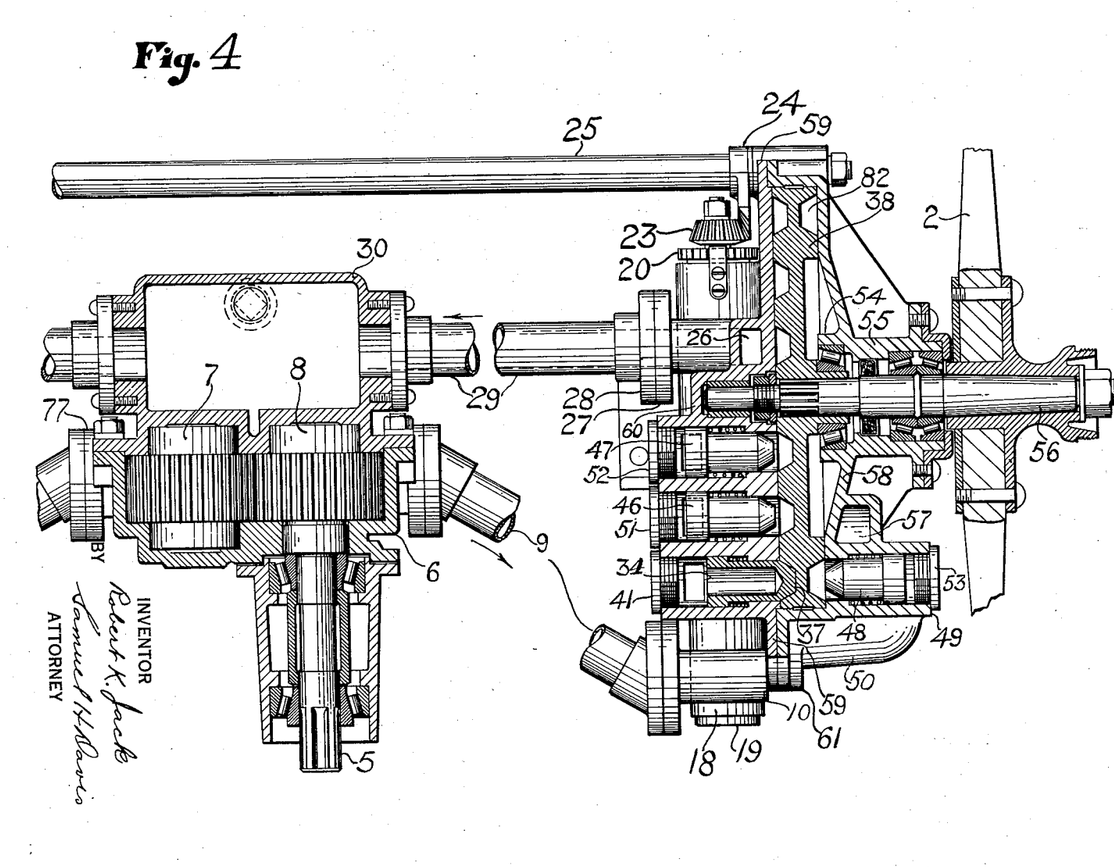
Fig. 4 is a sectional view showing the pump in section and the connecting pipes to the rotor and rotor casing also in section, all parts being illustrated as assembled.
Figure 5:
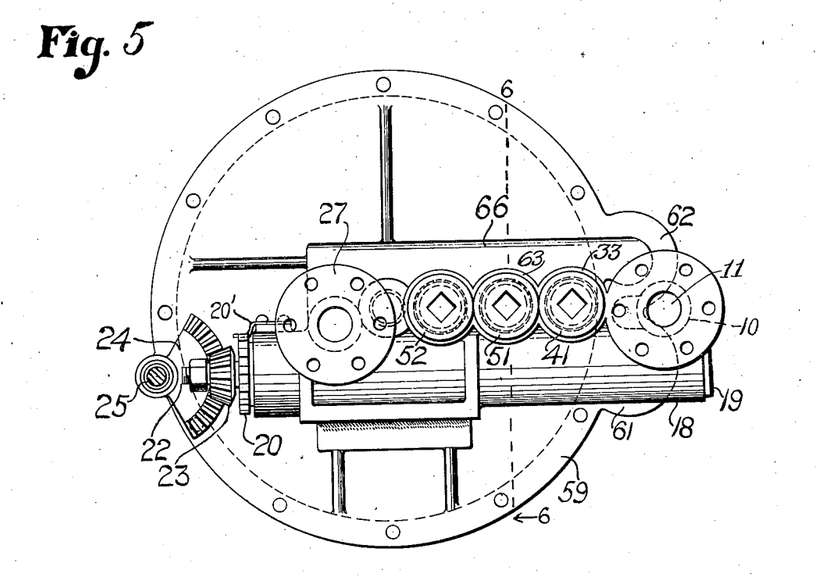
Fig. 5 is an external view of one of the members of the rotor housing, showing the radial arrangement of the tube valve case the positions of the drive tubes at different distances from the center, and the means for actuating the tube valve.
Figures 7, 8:
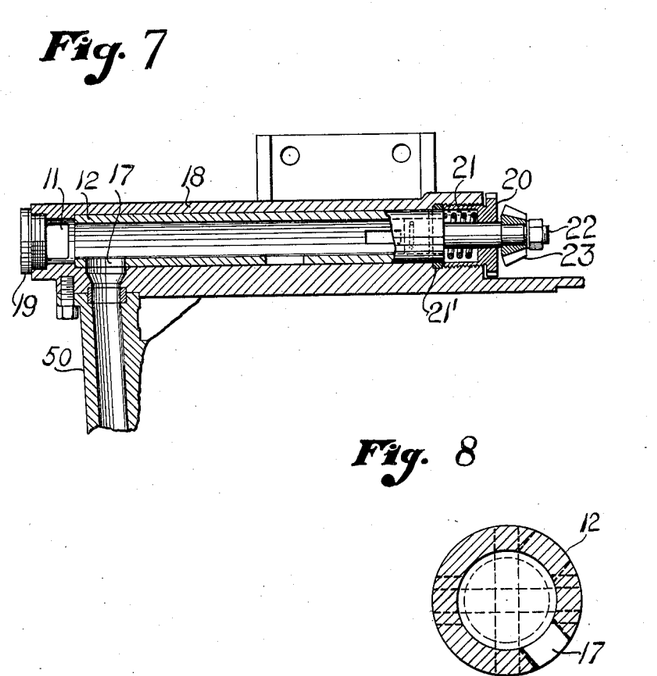
Fig. 7 is a longitudinal sectional view of the tube valve in position in the casing therefor.
Fig. 8 is a cross section of the tube valve taken on the broken line 8—8 of Fig. 9.
Figure 9:
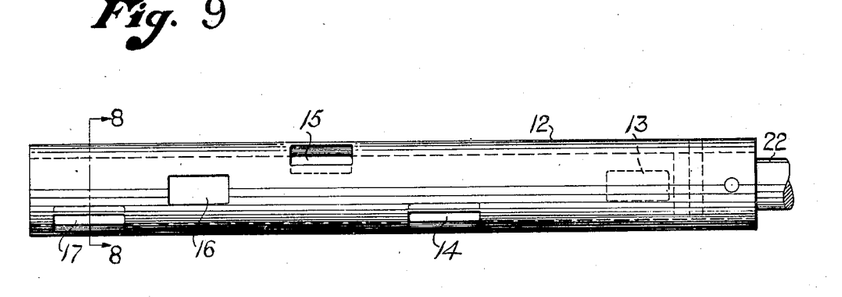
Fig. 9 is an external view of the tube valve alone.

Considering Fig. 1 of the drawings, an automobile frame 1 has the driven wheels 2 and front wheels 3. The frame carries a motor or engine 4 having a drive shaft 5 leading to a pump casing 6, within which are pump gears 7 and 8. This invention is not limited to any type of pump, or to the means for driving the pump, as the invention may be as well applied to actuating any machine other than a propelled vehicle. From the pump a pipe 9 leads to a connection 10, and as best shown in Fig. 7, an opening 11 in the casing 18 leads from the connection 10 into the tube valve 12, which is provided with spaced ports 13, 14, 15, 16 and 17, and can be turned in either direction in a sleeve or casing 18. A screw cap 19 closes the end of casing 18 beyond opening 11, and the other end of the casing is closed by a hollow screw cap 20 the rim of which is provided with teeth as also illustrated in Figs. 4 and 5. As shown in Fig. 5 a resilient catch 20' engages the rim teeth of cap 20 which may thus be adjusted and held in a desired position. The spring 21 shown in Fig. 7 encircles a stub shaft 22 which passes through the cap 20 and carries the mitre gear 23 outside the cap. By means of the cap 20 and the catch and spring the tube valve may be held in place against displacement due to the movements of the vehicle. To turn the tube valve there are provided, as best shown in Fig. 4, a segmental gear 24 engaging the mitre gear, and carried by a revoluble shaft 25, again to be mentioned herein.

In Fig. 4 is shown the position of the general exhaust channel 26, and flanges 27 and 28 couple the enclosing walls of the channel with a return pipe 29 leading back to the expansion chamber 30 and, therefore, back to the pump mechanism in order that the driving fluid may be circulated.

Figure 11:
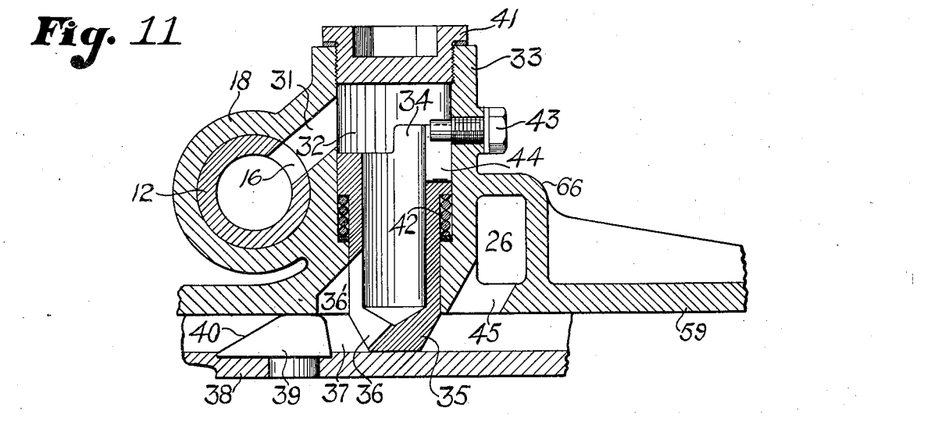
Fig. 11 is a sectional view of one of the drive plugs in its casing in the housing member, showing also the tube valve in section and the communicating ports between the valve and the plug.
Figure 16:
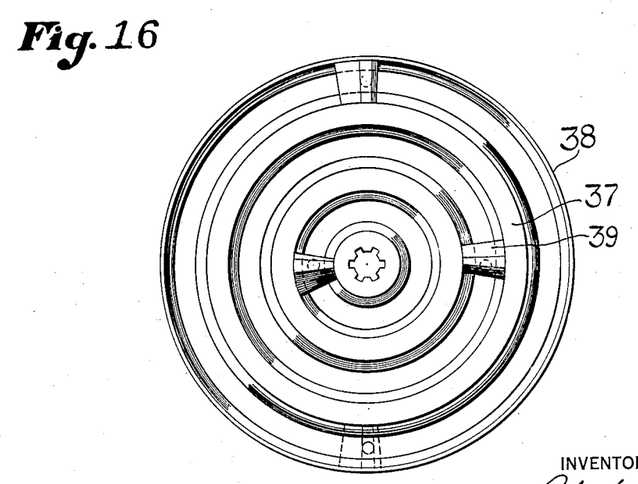
Fig. 16 is a face view of the rotor showing the concentric circular grooves therein and the drive blocks fixed in the grooves.

Considering Fig. 11, it will be noted that the tube valve 12 in its casing 18 has a port 16 leading by way of the passage 31 into the interior 32 of the case 33 which is occupied by the hollow drive plug 34. The partly closed end 35 of the plug has a port 36 leading to a rotor groove 37 in the face of the rotor 38, the rotor grooves being best shown in Fig. 16. Extending and fixed in groove 37 is a stop block 39, one side of which marked 40 is inclined. It will be here noted that the end 35 of the plug is conical or inclined, and when the rotor in its revolution brings the incline 40 of the block 39 into contact with the end of the plug, it retracts the plug against the pressure therein and the block passes the plug. The plug case 33 is closed by the screw cap 41, and the plug is held in its retracted position by means of the encircling coil spring 42 acting upon the plug and upon the interior of the case as shown. A plug or abutment is held in its retracted position by its spring, not at all times, but only when the supply of the operating fluid is cut off from that particular plug. The retractile movement of the plug is limited by the engagement of the screw stop 43 with the end of the recess 44 in the plug. It may also be pointed out here that as the block 39 retracts the plug it uncovers at the same time the exhaust port 45 into the general exhaust channel 26 and the groove is relieved of pressure until the block has passed the plug and the pressure of the operating fluid has moved the plug into the groove again in order that the fluid may act against the plug and against the block to drive the rotor.

Figure 10:
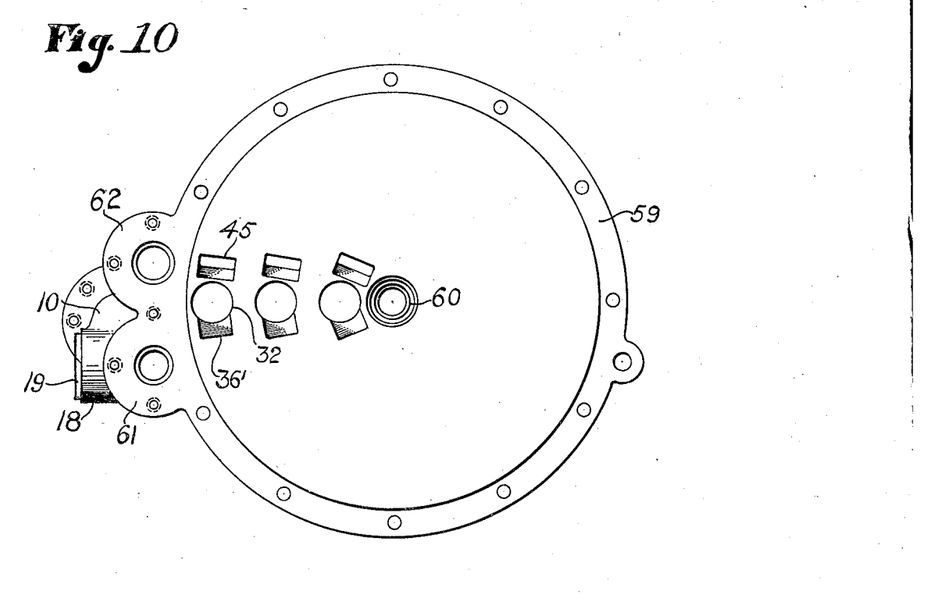
Fig. 10 is an inside view of the member of the rotor housing illustrated in Fig. 5 showing the ports and positions of the openings in which the abutments or drive plugs are placed.
Figures 13, 14:
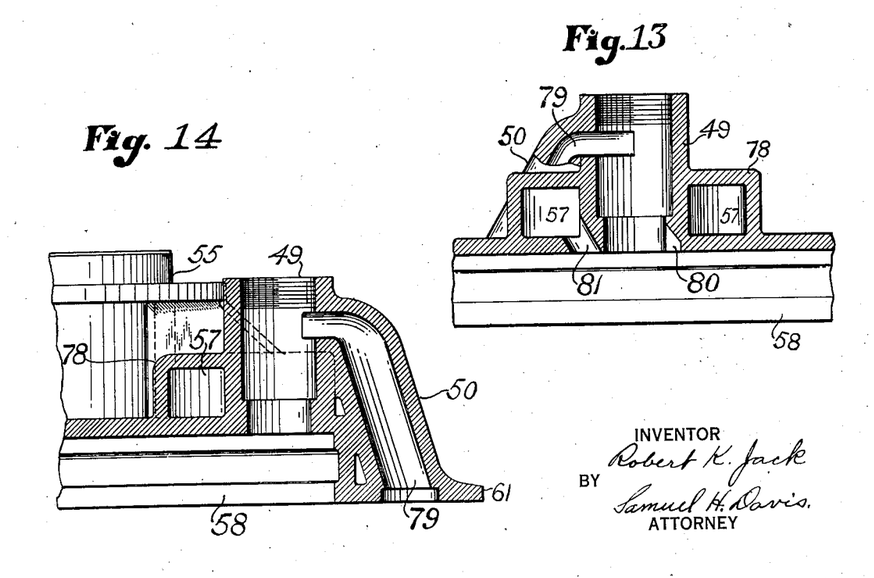
Fig. 13 is a sectional view of parts set out in Fig. 12 taken on the indirect broken line 13—13 of Fig. 12.
Fig. 14 is a sectional view of parts set out in Fig. 12 taken on the broken indirect line 14—14 of Fig. 12.

Considering Fig. 4, it will be observed that the drive plug 34 is farthest from the center, that the plug 46 is nearer the center, and the plug 47 the nearest of the three plugs to the center of rotation. These drive plugs are located in the housing in positions to act in the grooves on one face of the rotor, and there is arranged on the other side of the rotor a like drive plug 48 in a socket or case 49 fed by fluid from the connection 10 by way of the port 17 in the valve 12 and the conduit 50. This arrangement is best shown in Figs. 7 and 14. The cases or sockets for the drive plugs are each closed by a screw cap. Cap 41 closes externally the case of the plug 34; cap 51 closes the case of plug 46; cap 52 closes the case of plug 47, and cap 53 closes the case of the reverse plug 48 on the opposite face of the rotor in the rear separable member of the housing. It will be seen in Fig. 4 that this housing member has a central bearing for the housing marked 54 and a shaft bearing 55 for the wheel axle 56, and it has also an exhaust passage 57. The member as a whole is marked 58 and the other casing member 59 fits and may be suitably secured to the member 58. These members are illustrated together in Fig. 4 and constitute the housing for the rotor as will be understood. As shown in Fig. 10 the member 59 of the housing has a central bearing 60, also shown in Fig. 4, for the inner end of the axle 56. It will now be understood that the port 17 of valve 12 may be arranged to serve power fluid to single plug 48 on one face of the rotor and adapted to reverse the rotor. The valve port 16 directs the fluid to the plug 34 shown in Fig. 4 as farthest from the center. The valve port 15 similarly serves the intermediate plug 46, and the valve port 14 in like manner delivers the power fluid to the plug 47 nearest the center. The remaining valve port 13 is constructed and arranged to communicate with the general exhaust channel 26, in order that the engine or motor may continue to run idly when desired and merely circulate the fluid through the valve 12 and back to the pump by the return pipe 29.

Figure 12:
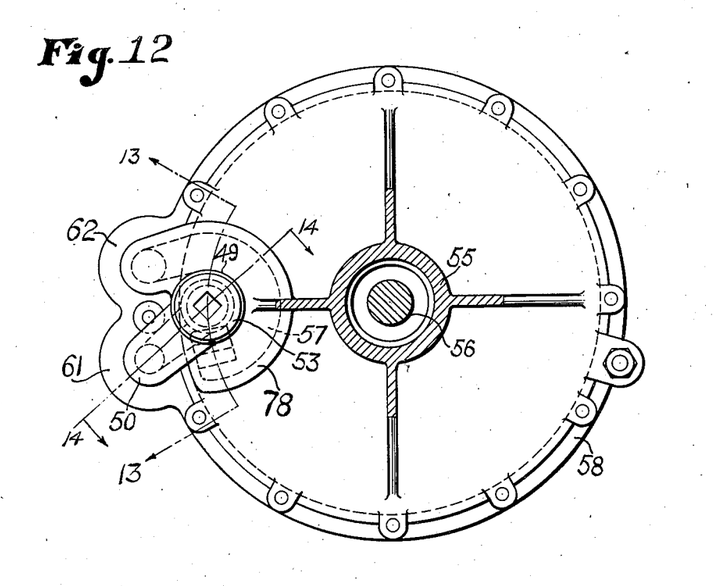
Fig. 12 is a rear view of the back housing member, showing the position of the reversing drive plug, and the central shaft and bearing which are in section.
Figure 15:
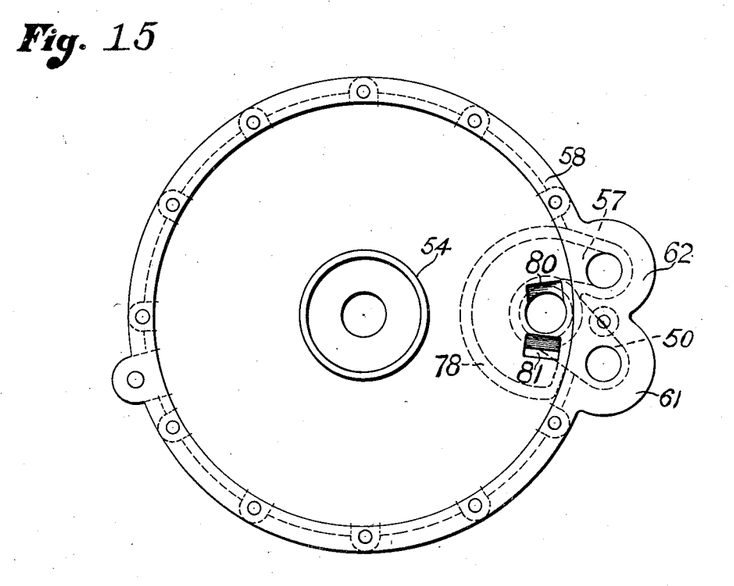
Fig. 15 is an inside view of the rear separable member of the rotor housing, showing the position of the reverse drive plug opening and ports.

As shown in Figs. 12 and 4, the conduit 50 has a connection flange 61 which also appears in Fig. 14, and the U-shaped exhaust passage 57 as indicated in Figs. 12 and 15 has its enclosing wall provided with a connecting flange 62.

Figure 6:
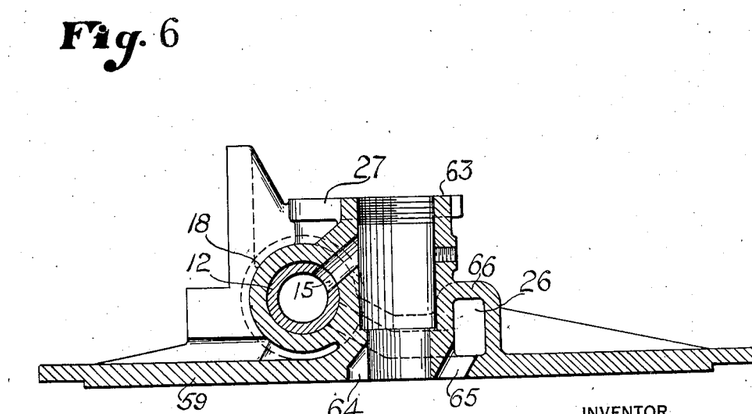
Fig. 6 is a sectional view of the parts shown in Fig. 5, the section being taken on the broken line 6—6 of Fig. 5.

Considering Fig. 6, the case or socket 63 is for the middle drive plug 46, and the case has the same construction as previously described for case 33 shown in Fig. 11. The drive port 64 leads from the case, and the exhaust port 65 opens into the general exhaust channel 26 the wall 66 of which is best shown in Fig. 5. The exhaust passage discharges by way of the flanged connections 27 and 28 into the return pipe 29 to the expansion chamber and pump.

Figure 2:
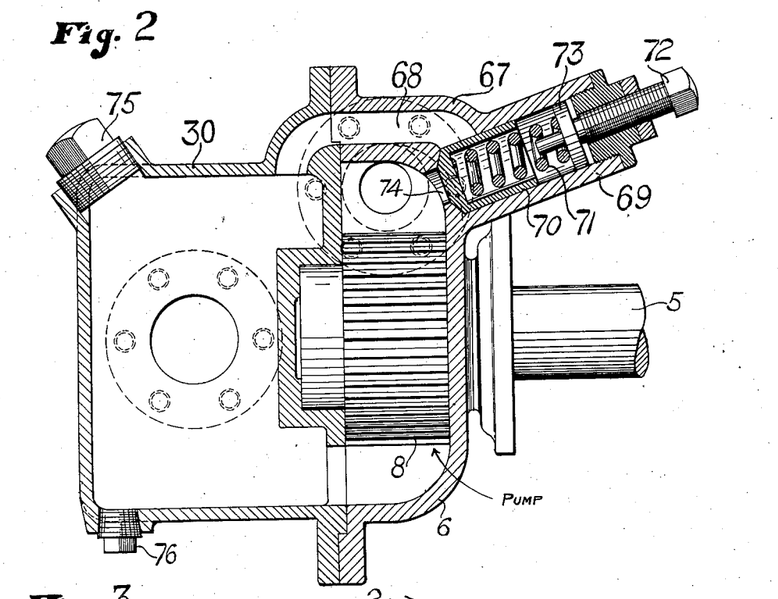
Fig. 2 is a sectional view of the pump casing and the expansion chamber, the section being taken on the broken line 2—2 of Fig. 3.

Next considering Fig. 2. The pump casing 6 may be formed with an extension 67 having a passage 68 into a projecting tubular portion 69 wherein operates a safety valve 70 yieldingly held upon its seat by the helical spring 71 adjustable by means of the adjusting screw 72 acting upon the head 73 in contact with the end of the spring. Excess pressure in the pump chamber is thus guarded against. Also in Fig. 2 are shown the removable screw plugs 75 and 76 by way of which the interior of the expansion chamber 30 may be reached to prime the same or to remove any obstructing deposit.

Figure 3:
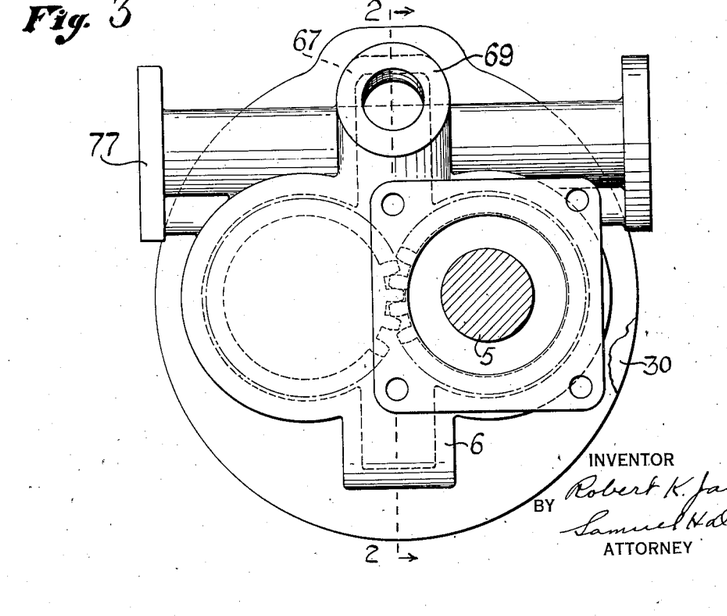
Fig. 3 is a front view of the pump casing and the expansion tank in rear thereof.

In Figs. 1 and 3 a flange 77 is shown by which the pump may be connected with rotor mechanism for the other wheel 2, all of the same structure and operation as described herein.

In Figs. 12, 13 and 14 the external wall 78 of the U-shape exhaust passage 57 is illustrated, and considering Fig. 13 the passage 79 from the conduit 50 will be noted opening into the case 49 for the reversing drive plug 48. From the case 49 the driving port 80 opens upon the rotor space in housing member 58, and the exhaust port for fluid from the reversing plug is marked 81 and leads into the exhaust passage 57. The rotor groove 82 is shown in Fig. 4 near the periphery of the rotor 38 is the rotor groove concerned in the reversing operation.

Any means selected may be introduced to operate the revoluble shaft 25 to rock the segment and turn the tube valve. The rod 83 is shown in Fig. 1 for that purpose, and in the operation as the shaft is moved the tube valve is turned either way, and the ports in the valve are by this means arranged to direct fluid under pressure into either drive plug. It is thought to be now made clear that if the fluid acts upon the drive plug farthest from the center, more leverage is attained and more power applied, but with slow speed of the rotor; whereas if the plug nearest the center is activated, the rotor will be turned at high speed. By suitably rotating the valve the reverse drive plug may be brought into play, and the rotation reversed, or, in the use of this invention as an automobile drive, a slight reversing effect acts as a brake for the vehicle. It is believed to be within the purview of this invention to modify the number, size and forms of the described elements, as such shapes would present themselves variously to capable mechanical men.

Having now described this invention and the manner of its use, I claim:—

1. In a fluid pressure power transmitting apparatus, the combination with a force pump, of a rotor having concentric circular grooves, a central shaft for the rotor, a rotor housing comprising separable members provided with shaft bearings, a tube valve, a tube valve casing carried by the rotor housing in radial position, means communicating with the pump and valve, means for operating said valve from a distance, said valve having spaced ports, a plurality of hollow drive plugs, one for each groove, arranged in said housing at different distances from the center and having springs normally holding said plugs retracted, said housing having driving ports leading from each drive plug to a rotor groove and said drive plugs having ports registering with the driving ports of said housing, said housing having passages for connecting the valve ports and driving ports, said drive plugs being adapted to be moved by fluid pressure into the said rotor grooves, a fixed power transmitting stop block located in each rotor groove and constructed to retract said plugs against pressure, said housing having exhaust ports communicating with said rotor grooves and an exhaust channel common to said ports and having an external opening.

2. In a fluid pressure power transmitting apparatus, the combination with a force pump, of a rotor having concentric circular grooves, a central shaft for the rotor, a rotor housing comprising separable members provided with shaft bearings for the rotor shaft, a tube valve, a tube valve casing carried by the rotor housing in radial position, means communicating with the pump and valve, means for operating the valve from a distance, said valve having spaced ports, a plurality of hollow drive plugs, one for each groove, arranged in said rotor housing at different distances from the center and having springs adapted to hold the plugs retracted, said housing having driving ports leading from each drive plug to a rotor groove and each drive plug having a port registering with the driving port of the housing, said housing having passages for connecting the valve ports and driving ports, said drive plugs adapted to be moved by fluid pressure into the rotor grooves, a fixed driving block in each groove constructed to retract a drive plug against pressure, an exhaust port in the said housing for each of said rotor grooves and an exhaust channel in the housing common to said exhaust ports and having an external outlet, and a return pipe from said outlet to said pump.

3. In a fluid pressure power transmitting apparatus, the combination with a force pump, of a rotor having concentric circular grooves in one face and a circular groove in the opposite face for reversing the rotor, a rotor housing comprising separable members provided with shaft bearings for the rotor shaft, a tube valve, a tube valve casing carried by the rotor housing in radial position, means communicating with the pump and valve, means for operating the valve from a distance, said valve having spaced ports, a plurality of hollow drive plugs, one for each groove, arranged at different distances from the center in said rotor housing and having springs adapted to normally hold the plugs retracted, said housing having driving ports leading from each drive plug to one of the rotor grooves and each drive plug having a port registering with the drive ports of the housing, said housing having passages for connecting the valve ports and driving ports, said driving plugs adapted to be moved by fluid pressure into the grooves of the rotor, a fixed driving block located in each rotor groove and constructed to retract a drive plug against pressure, an exhaust port in the housing registering with each of said rotor grooves, an exhaust channel carried by the housing in communication with the said exhaust ports, and the said channel having an exhaust outlet.

4. In a fluid pressure power transmitting apparatus, the combination with a force pump, of a rotor having concentric circular grooves in one face and a circular groove in the opposite face for reversing the rotor, a rotor housing comprising separable members provided with shaft bearings for the rotor shaft, a tube valve, a tube valve casing carried by the rotor housing in radial position, means communicating with the pump and valve, means for operating the valve from a distance, said valve having spaced ports, a plurality of hollow drive plugs, one for each groove, arranged at different distances from the center in said rotor housing and having springs adapted to normally hold the plugs retracted, said housing having driving ports leading from each drive plug to one of the rotor grooves and each drive plug having a port registering with the driving ports of the housing, said housing having passages for connecting the valve ports and driving ports, said drive plugs adapted to be moved by fluid pressure into the grooves of the rotor, a fixed driving block located in each rotor grove and constructed to retract a drive plug against pressure, an exhaust port in the housing for each of the said rotor grooves, an exhaust channel carried by the housing in communication with the said exhaust ports, said channel having an exhaust outlet, and a return pipe from said outlet to the said pump.

5. In a fluid pressure power transmitting apparatus, the combination with a force pump, of a rotor, a rotor housing, a rotor shaft in the housing, a tube valve, a tube valve casing on the said housing arranged in radial position, said valve and casing having spaced ports whereby power fluid may be applied to the rotor at different distances from the center, said rotor having annular grooves on opposite sides thereof, each groove having a stop block in the path of fluid from the said valve ports for rotating the rotor in opposite directions, said housing having on opposite sides pressure projected spring withdrawn drive plugs constructed and arranged to enter and constitute abutments in said rotor grooves, means for operating the valve, the said force pump being in communication with the said valve casing, exhaust ports in the housing in communication with the rotor, and a return pipe in communication with the said exhaust ports and leading to the said pump.

ROBERT K. JACK.